United States Patent
Sugimoto et al.

(10) Patent No.: US 9,785,333 B2
(45) Date of Patent: Oct. 10, 2017

(54) DISPLAY DEVICE, IMAGE PROCESSING APPARATUS, NON-TRANSITORY COMPUTER READABLE MEDIUM, AND DISPLAY CONTROL METHOD

(71) Applicant: FUJI XEROX CO., LTD., Tokyo (JP)

(72) Inventors: Hideaki Sugimoto, Kanagawa (JP); Nozomi Noguchi, Kanagawa (JP); Shinichi Nakamura, Kanagawa (JP); Tsuyoshi Toda, Kanagawa (JP); Takafumi Haruta, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 25 days.

(21) Appl. No.: 14/814,651

(22) Filed: Jul. 31, 2015

(65) Prior Publication Data
US 2016/0266703 A1 Sep. 15, 2016

(30) Foreign Application Priority Data

Mar. 13, 2015 (JP) ................................. 2015-050690

(51) Int. Cl.
| | |
|---|---|
| *G06F 3/0485* | (2013.01) |
| *G06F 3/0488* | (2013.01) |
| *G06F 3/0482* | (2013.01) |
| *G06F 3/0481* | (2013.01) |
| *G06T 3/40* | (2006.01) |
| *G06F 3/0486* | (2013.01) |
| *G09G 3/36* | (2006.01) |
| *G06F 17/24* | (2006.01) |

(52) U.S. Cl.
CPC .......... *G06F 3/0485* (2013.01); *G06F 3/0481* (2013.01); *G06F 3/0482* (2013.01); *G06F 3/0486* (2013.01); *G06F 3/0488* (2013.01); *G06F 3/04817* (2013.01); *G06T 3/40* (2013.01); *G06F 17/24* (2013.01); *G09G 3/36* (2013.01)

(58) Field of Classification Search
None
See application file for complete search history.

(56) References Cited

U.S. PATENT DOCUMENTS

| | | | |
|---|---|---|---|
| 7,116,357 B1 * | 10/2006 | Oya .................... | G08B 13/1968 348/143 |
| 2008/0174597 A1 | 7/2008 | Takagi | |
| 2012/0054794 A1 * | 3/2012 | Kim ...................... | G06F 3/0346 725/38 |
| 2013/0222283 A1 * | 8/2013 | Yun ....................... | G06F 3/0488 345/173 |
| 2014/0078184 A1 * | 3/2014 | Sumita ..................... | G06T 3/40 345/667 |
| 2014/0351698 A1 * | 11/2014 | Nakagawa ............ | G06F 3/0485 715/702 |
| 2015/0365559 A1 * | 12/2015 | Nakamura ......... | H04N 1/32309 358/3.28 |

FOREIGN PATENT DOCUMENTS

JP 2008-176658 A 7/2008

\* cited by examiner

*Primary Examiner* — Jwalant Amin
(74) *Attorney, Agent, or Firm* — Sughrue Mion, PLLC

(57) ABSTRACT

A display device includes a display controller. The display controller performs control such that an image that is being partially displayed is fully displayed without any missing portion on a display screen, when arrangement of plural displayed images is changed.

7 Claims, 7 Drawing Sheets

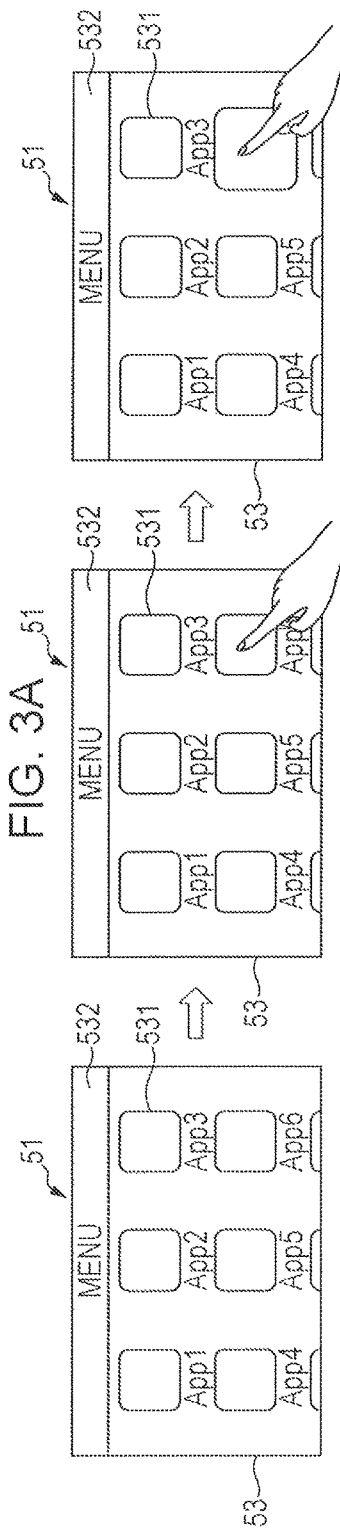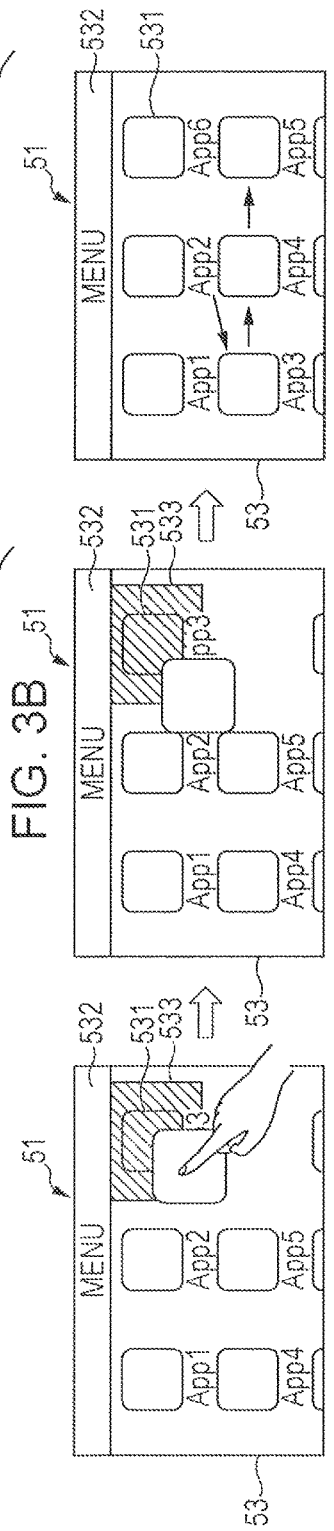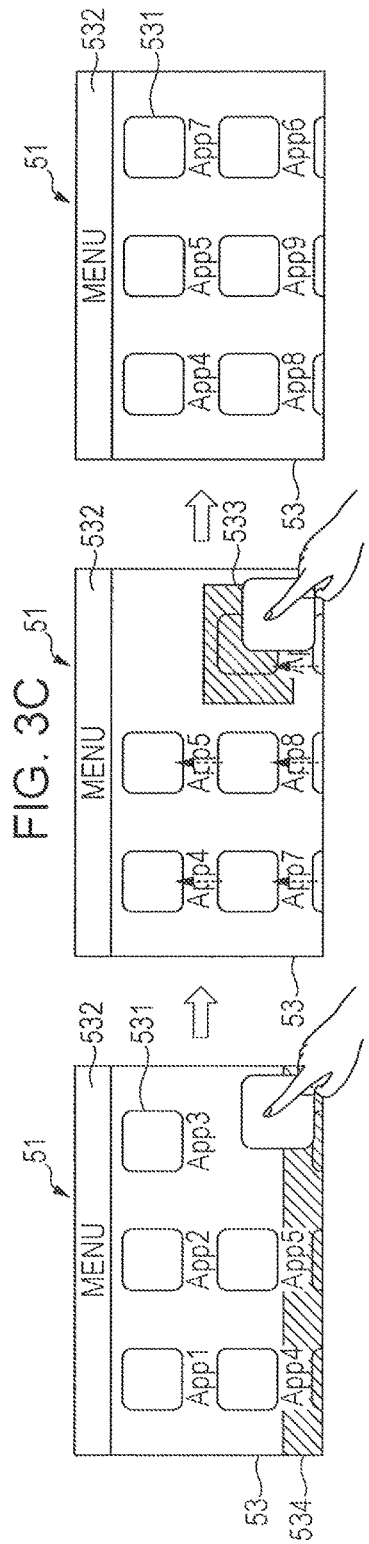

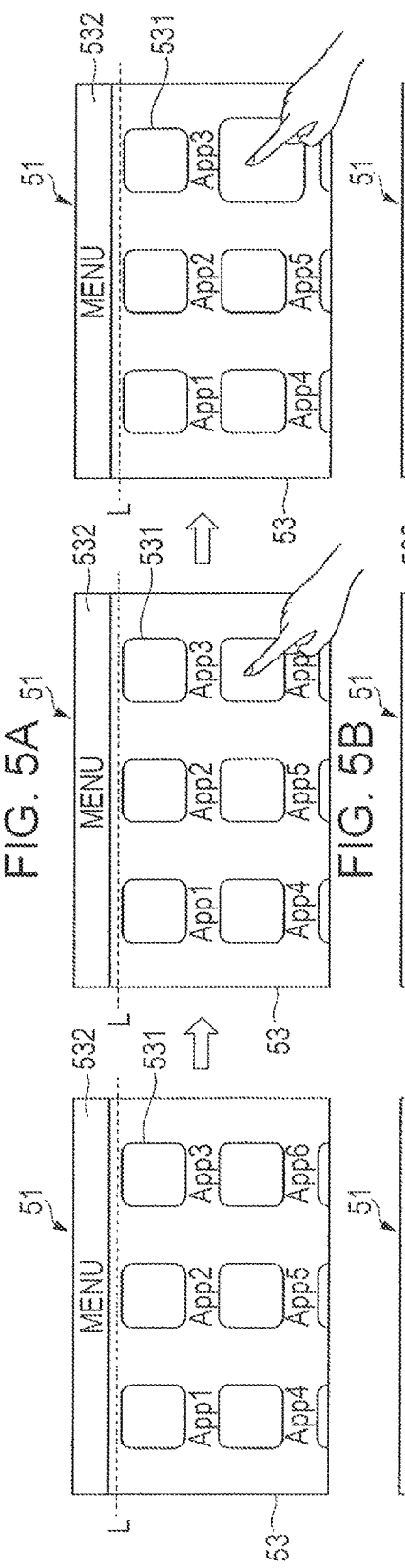

DISPLAY DEVICE, IMAGE PROCESSING APPARATUS, NON-TRANSITORY COMPUTER READABLE MEDIUM, AND DISPLAY CONTROL METHOD

CROSS-REFERENCE TO RELATED APPLICATIONS

This application is based on and claims priority under 35 USC 119 from Japanese Patent Application No. 2015-050690 filed Mar. 13, 2015.

BACKGROUND (i) Technical Field

The present invention relates to a display device, an image processing apparatus, a non-transitory computer readable medium, and a display control method.

(ii) Related Art

Electronic devices having multiple functions selectively used employ display devices having a menu screen. The menu screen displays multiple images (icons) for the multiple functions and allows a user to select a function to use. If all the icons do not fit within the screen of such display devices, the user sometimes scrolls up, down, to the left, or to the right (changes) the display image to display the hidden icons.

On display devices having a scroll function, icons are sometimes partially displayed because scrolling is stopped at a given position. In such cases, an area provided around each partially displayed icon to detect insertion of another icon sometimes becomes smaller than an area provided around each fully displayed icon.

SUMMARY

According to an aspect of the invention, there is provided a display device including a display controller. The display controller performs control such that an image that is being partially displayed is fully displayed without any missing portion on a display screen, when arrangement of plural displayed images is changed.

BRIEF DESCRIPTION OF THE DRAWINGS

Exemplary embodiments of the present invention will be described in detail based on the following figures, wherein:

FIG. 1A illustrates the image processing apparatus, and FIG. 1B illustrates the display unit;

FIG. 2A illustrates an example of selection buttons and a display image initially displayed, FIG. 2B illustrates an example in which the display image is changed by scrolling, and FIG. 3C illustrates an example in which the display image is changed by scrolling further;

FIGS. 3A to 3C illustrate a method for changing a layout of the selection buttons, specifically, FIG. 3A illustrates a method for changing the operation mode from a selection mode to a layout change mode, FIG. 3B illustrates an example of a layout change, and FIG. 3C illustrates another example of a layout change;

FIG. 4A illustrates the case where the insertion detection area is large, and FIG. 4B illustrates the case where the insertion detection area is small;

FIGS. 5A to 5C illustrate a scroll adjustment according to a first exemplary embodiment, FIG. 5A illustrates a case where no scroll adjustment is needed, and FIGS. 5B and 5C illustrate a case where a scroll adjustment is performed;

FIG. 7A illustrates the case of performing a scroll adjustment, and FIG. 7B illustrates the case of not performing a scroll adjustment.

DETAILED DESCRIPTION

Exemplary embodiments of the present invention will be described below with reference to the accompanying drawings. A display device according to the exemplary embodiments will be described below using a display unit 5 of an image processing apparatus 100 by way of example; however, the display device according to the exemplary embodiments may be included in an apparatus other than the image processing apparatus 100.

First Exemplary Embodiment

Figure 1B:
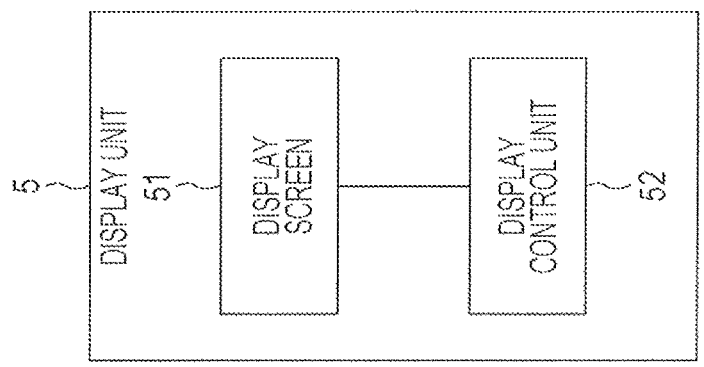
FIGS. 1A and 1B are block diagrams illustrating examples of hardware configurations of an image processing apparatus and a display unit, specifically.
Figure 1A:
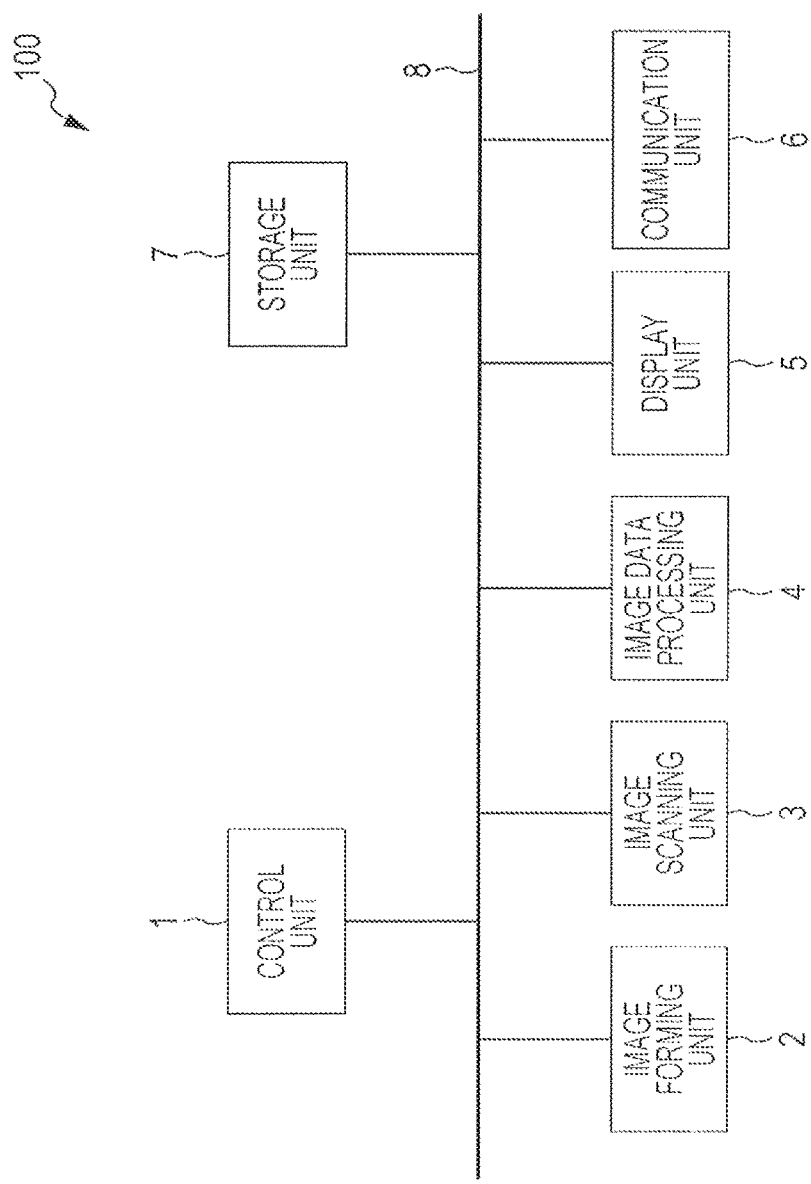

FIGS. 1A and 1B are block diagrams illustrating examples of hardware configurations of the image processing apparatus 100 and the display unit 5. Specifically, FIG. 1A illustrates the image processing apparatus 100, and FIG. 1B illustrates the display unit 5.

As illustrated in FIG. 1A, the image processing apparatus 100 includes a control unit 1, an image forming unit 2, an image scanning unit 3, an image data processing unit 4, the display unit 5, a communication unit 6, and a storage unit 7, which are connected to a bus 8 and exchange data via the bus 8.

The image forming unit 2, the image scanning unit 3, and the image data processing unit 4 are an example of an image processor.

The control unit 1 controls the aforementioned functional units of the image processing apparatus 100. For example, the control unit 1 includes a central processing unit (CPU), a read-only memory (ROM), and a random access memory (RAM). In the control unit 1, a control program executed by the CPU is stored in the ROM. The CPU reads the control program stored in the ROM and executes the control program by using the RAM as its workspace. As a result of the CPU executing the control program, the control unit 1 controls the individual functional units of the image processing apparatus 100.

Note that the control program may be stored in the storage unit 7 (described later).

In addition, the control program executed by the CPU may be provided after being stored on a computer readable recording medium, such as a magnetic recording medium (e.g., a magnetic tape or magnetic disk), an optical recording medium (e.g., an optical disc), a magneto-optical recording medium, or a semiconductor memory. Further, the control program may be downloaded to the image processing apparatus 100 via a communication network, such as the Internet.

The image forming unit 2 includes an image forming mechanism that forms a toner image on a sheet in accordance with image data by using a technique, such as electrophotography.

The image scanning unit 3 includes an image scanning apparatus (scanner) that scans a document and generates image data representing an image of the scanned document. The image scanning unit 3 outputs the generated image data to the image data processing unit 4.

The image data processing unit 4 performs image processing, such as color correction and gradation correction, on the input image data, generates image-processed image data, and outputs the generated image data to the image forming unit 2. Note that image data is input to the image data processing unit 4 also via the communication unit 6 (described later).

The display unit 5 includes a display screen 51 equipped with a touch panel as illustrated in FIG. 1B. The display unit 5 displays a display image 53 (see FIGS. 2A to 2C (described later)) for accepting an operation from a user, and accepts an operation from a user via the display image 53.

The communication unit 6 is connected to a communication network (not illustrated) and functions as a communication interface that communicates with another apparatus connected to the communication network.

The storage unit 7 includes a storage device, such as a hard disk drive (HDD). The storage unit 7 stores data received by the communication unit 6 and data generated by the image scanning unit 3 and the image data processing unit 4, for example.

As illustrated in FIG. 1B, the display unit 5 includes the display screen 51 equipped with a touch panel, and a display control unit 52. The display screen 51 is a display device such as a liquid crystal display, for example, and is equipped with a capacitive touch panel, for example.

The display image 53 is displayed on the display screen 51. The display image 53 is an image (content) displayed on the display screen 51. Accordingly, the display image 53 changes in accordance with a user instruction or control by the control unit 1.

The display control unit 52 includes a CPU, a ROM, and a RAM just like the control unit 1. The display control unit 52 displays data concerning the image processing apparatus 100 on the display screen 51 (display device) under control of the control unit 1. That is, the display control unit 52 has a display function. In addition, the display control unit 52 accepts an operation from a user via the touch panel.

The control unit 1 of the image processing apparatus 100 may function as the display control unit 52.

The display control unit 52 is an example of a display controller.

It is assumed hereinafter that a user operates the touch panel with their finger. That is, the user touches the touch panel of the display screen 51 with their finger to input an operation. An instruction changes depending on the way of touching the touch screen with the finger.

Examples of the way of touching the touch panel with the finger include "touch", "drag," and "flick".

"Touch" refers to an operation in which the user moves their finger off the display screen 51 after keeping touching the display screen 51 with their finger for a predetermined period of time or longer.

"Drag" refers to an operation in which the user moves their finger off the display screen 51 after moving their finger on the display screen 51 while keeping the finger in contact with the display screen 51. That is, "drag" is moving the finger while keeping the finger in contact with the display screen 51.

"Flick" refers to an operation in which the user moves their finger off the display screen 51 after touching the display screen 51 with their finger like brushing the display screen 51. That is, "flick" is moving the finger that is in contact with the display screen 51 like brushing the display screen 51.

The display control unit 52 distinguishes between the ways of touching the display screen 51 with the finger, such as "touch", "drag", and "flick", and recognizes an instruction.

Operations may be input using a stylus or the like, instead of the finger.

Figure 2A:
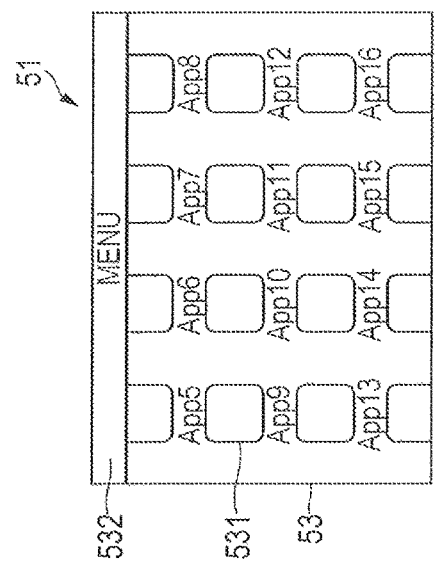
FIGS. 2A to 2C illustrate examples of a display image including selection buttons displayed on a display screen of the display unit, specifically.
Figure 2B:
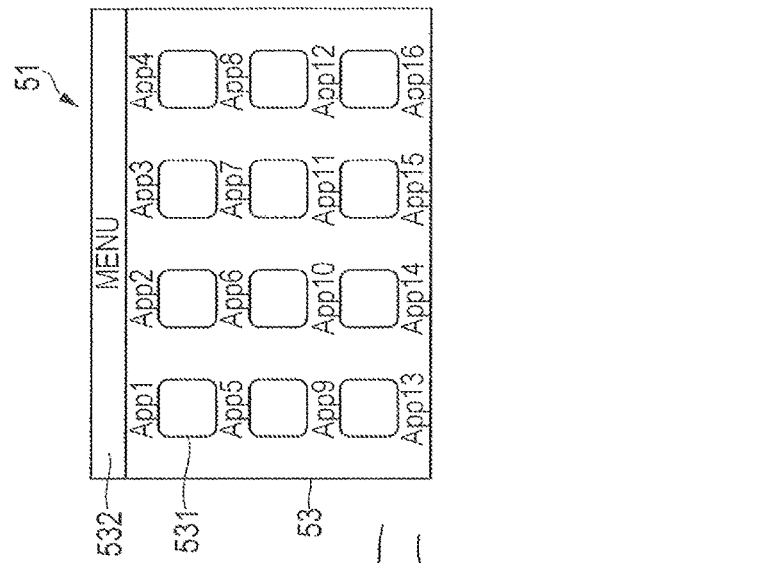
Figure 2C:
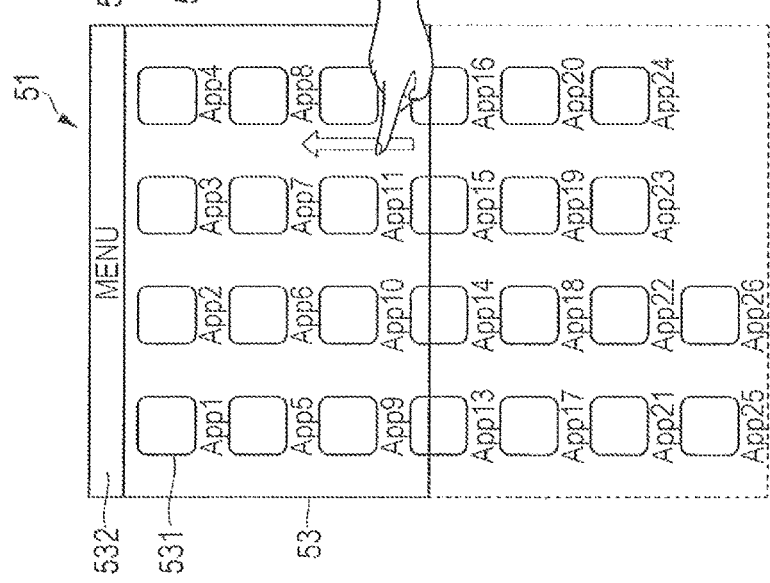

FIGS. 2A to 2C illustrate examples of the display image 53 including selection buttons 531 displayed on the display screen 51 of the display unit 5. Specifically, FIG. 2A illustrates an example of the selection buttons 531 and the display image 53 initially displayed, FIG. 2B illustrates an example in which the display image 53 is changed by scrolling, and FIG. 2C illustrates an example in which the display image 53 is changed by scrolling further. Hereinafter, the selection buttons 531 are also referred to as icons or images.

The selection buttons 531 (icons or images) allow the user to control operations of a computer without inputting a command using a keyboard. The selection buttons 531 (icons or images) are pictures into which functions of applications or content of files are symbolized. Such symbolized pictures may additionally include text, or the selection buttons 531 may be represented by text alone.

The display screen 51 of the display unit 5 displays the multiple selection buttons 531 each associated with one of plural functions so as to allow the user to select a function from among the plural functions of the image processing apparatus 100. It is assumed that twenty-six selection buttons 531 are displayed for functions App1 to App26, for example. The functions App1 to App26 include, for example, a "copy function" and a "scan function" of the image processing apparatus 100.

FIGS. 2A to 2C illustrate the selection buttons 531 labeled as App1 to App26 to indicate that different functions are associated with the different selection buttons 531. The functions App1 to App26 are collectively referred to as functions App when they are not distinguished from one another.

The user selects (touches) one of the multiple selection buttons 531 with their finger, thereby selecting the function App associated with the selection button 531 and causing the image processing apparatus 100 to perform the function App.

It is assumed that the display screen 51 of the display unit 5 is not capable of displaying all the twenty-six selection buttons 531 at one time and that the twenty-six selection buttons 531 are managed as single continuous content instead of being distributed to multiple pages.

As illustrated in FIG. 2A, in response to power-on of the image processing apparatus 100, the display image 53 including the selection buttons 531 surrounded by a solid line is displayed on the display screen 51 of the display unit 5. In the display image 53, twelve selection buttons 531 associated with the functions App1 to App12 among the twenty-six selection buttons 531 are fully displayed, and the selection buttons associated with the functions App13 to App16 are partially displayed. Further, the selection buttons 531 associated with the functions App17 to App26 are not displayed in the display image 53.

The display image 53 has a title image 532, which displays "MENU", at the top portion thereof. The title image 532 allows the user to recognize that the display image 53 is a menu screen. As described later, the title image 532 is fixed at the upper end of the display screen 51 even if the display image 53 is scrolled.

The title image 532 may be omitted.

The state where the selection button 531 is fully displayed indicates the state where the entire selection button 531 is displayed on the display screen 51. In the case where the title image 532 is displayed at a predetermined place on the display screen 51 in a fixed manner, the state where the selection button 531 is fully displayed indicates the state where the entire selection button 531 is displayed on a portion of the display screen 51 other than a portion where the title image 532 is displayed.

In addition, the state where the selection button 531 is partially displayed indicates the state where a portion of the selection button 531 extends off the display screen 51. In the case where the title image 532 is displayed at a predetermined place on the display screen 51 in a fixed manner, the state where the selection button 531 is partially displayed indicates the state where a portion of the selection button 531 extends off a portion of the display screen 51 other than a portion where the title image 532 is displayed.

In addition, the state where the selection button 531 is hidden indicates the state where the selection button 531 is not displayed on the display screen 51 at all. In the case where the title image 532 is displayed at a predetermined place on the display screen 51 in a fixed manner, the state where the selection button 531 is hidden indicates the state where the selection button 531 is not displayed at all on a portion of the display screen 51 other than a portion where the title image 532 is displayed.

In FIG. 2A, twelve selection buttons 531 are fully displayed.

If the user drags the display screen 51 upward with their finger as illustrated in FIG. 2A, the display image 53 is scrolled (moved) up.

As illustrated in FIG. 2B, the selection buttons 531 associated with the functions App1 to App4, which have been displayed in the display image 53 illustrated in FIG. 2A, now extend off the display screen 51 at the upper edge. The selection buttons 531 associated with the functions App13 to App16, which have been partially displayed, are now fully displayed.

The title image 532 is kept displayed at the upper end of the display screen 51 after the display image 53 is scrolled.

As in FIG. 2A, twelve selection buttons 531 associated with the functions App5 and App16 are fully displayed in FIG. 2B.

If the user further scrolls up the display image 53, the selection buttons 531 associated with the functions App5 to App8, which have been fully displayed in FIG. 2B, are now partially displayed as illustrated in FIG. 2C. Also, the selection buttons 531 associated with the functions App17 to App20, which have been hidden, are now partially displayed.

In FIG. 2C, eight selection buttons 531 associated with the functions App9 to App16 are fully displayed.

The title image 532 is kept displayed at the upper end of the display screen 51 after the display image 53 is scrolled.

As described above, the display image 53 is changed by scrolling the display image 53. The user is able to skim through the entire content by continuously scrolling the display image 53 and to stop the display image 53 at a given position by stopping scrolling when the selection button 531 which the user wishes to select appears in the display image 53.

Note that scrolling may be started by "flick" in addition to "drag".

However, if the user stops scrolling at a given position, the number of selection buttons 531 that are fully displayed on the display screen 51 may vary as illustrated in FIGS. 2A to 2C.

Now, a method for changing the arranged order of the selection buttons 531, that is, a layout (arrangement) of the selection buttons 531 (layout change) will be described.

The selection buttons 531 frequently selected by the user are desirably arranged at positions so that such selection buttons 531 are displayed without scrolling. Accordingly, the layout of a predetermined selection button 531 needs to be changed.

An operation mode in which the user touches the selection button 531 to perform the function App associated with the selection button 531 is referred to as a selection mode. In addition, an operation mode in which the layout of the selection buttons 531 is changed is referred to as a layout change mode. Note that the term "layout change" not only refers to the case of changing the position of the selection button 531 but also the case of deleting the selection button 531 and the case of adding the selection button 531.

FIGS. 3A to 3C illustrate a method for changing the layout of the selection buttons 531. Specifically, FIG. 3A illustrates a method for changing the operation mode from the selection mode to the layout change mode, FIG. 3B illustrates an example of a layout change, and FIG. 3C illustrates another example of a layout change.

Referring to FIG. 3A, the method for entering the layout change mode from the selection mode will be described. The description is given of an example in which the arranged position of the selection button 531 associated with the function App6 is changed.

As illustrated in a left figure of FIG. 3A, six selection buttons 531 associated with the functions App1 to App6 are fully displayed in the display image 53.

As illustrated in a central figure of FIG. 3A, the user, for example, long-presses the selection button 531 associated with the function App6 in order to make the operation mode enter the layout change mode.

"Long-press" is an operation in which the user moves off their finger from the display screen 51 after keeping touching the display screen 51 for a predetermined period of time or longer. Here, the predetermined period of time is longer than a period for which the user touches the selection button 531 to select the corresponding function App.

In response to the "long-press" operation, the selection button 531 associated with the function App6 is displayed, for example, in a larger size (in an enlarged manner) as illustrated in a right figure of FIG. 3A. In this way, the user recognizes that the selection button 531 associated with the function App6 has entered the layout change mode.

Referring now to FIG. 3B, an example of a layout change will be described.

The selection button 531 associated with the function App6 is inserted at (moved to) the position of the selection button 531 associated with the function App3.

As illustrated in a left figure of FIG. 3B, the user drags the enlarged selection button 531 associated with the function App6 to the position of the selection button 531 associated with the function App3.

Each of the selection buttons 531 is provided with an insertion detection area 533 over and around the selection button 531. The insertion detection area 533 is used to determine the position where the selection button 531 is to be inserted.

Accordingly, the user drags the enlarged selection button 531 associated with the function App6 to the insertion detection area 533 of the selection button 531 associated with the function App3.

At that time, the center of the enlarged selection button 531 associated with the function App6 just needs to be in the insertion detection area 533 of the selection button 531 associated with the function App3 as illustrated in a central figure of FIG. 3B. That is, the enlarged selection button 531 associated with the function App6 need not entirely cover the selection button 531 associated with the function App3.

If the user holds the enlarged selection button 531 associated with the function App6 in the insertion detection area 533 of the selection button 531 associated with the function App3 for a predetermined period of time, the display control unit 52 determines that the selection button 531 associated with the function App6 is to be arranged at the position of the selection button 531 associated with the function App3.

Then, the display control unit 52 arranges the selection button 531 associated with the function App6 at the position of the selection button 531 associated with the function App3 as illustrated in a right figure of FIG. 3B. The display control unit 52 then arranges the selection buttons 531 associated with the function App3 and the following functions by sequentially shifting their positions by one.

In this way, the layout of the selection buttons 531 is changed. In this example, the layout of the selection buttons 531 is changed within the display image 53.

Note that the selection buttons 531 for the function App3 and the following functions may be shifted in accordance with their numbers or downward, or shifted to other positions.

Referring now to FIG. 3C, another example of a layout change will be described. In this example, the selection button 531 associated with the application App6 is to be arranged at a position which is not being displayed in the display image 53.

First, the user makes the selection button 531 associated with the function App6 enter the layout change mode using the method described in FIG. 3A in order to change the position of the selection button 531 associated with the function App6, as illustrated in a left figure of FIG. 3C.

It is assumed in this example that the selection button 531 associated with the function App6 is to be arranged at the position of the selection button 531 associated with the function App9.

In this case, the selection button 531 associated with the function App9 is not being displayed on the display screen 51 and extends off the bottom edge of the display screen 51 as illustrated in FIG. 3C. Accordingly, the user drags the selection button 531 associated with the selected function App6 to an image scrolling detection area 534 provided at a bottom portion of the display screen 51. The image scrolling detection area 534 is used to determine whether to scroll the image.

Then, the display image 53 is scrolled up as illustrated in a central figure of FIG. 3C. As a result, the selection buttons 531 associated with the functions App7, App8, and App9, which have been hidden, are now displayed. The user then drags the enlarged selection button 531 associated with the function App6 to the insertion detection area 533 of the selection button 531 associated with the function App9.

The display control unit 52 then determines that the position of the selection button 531 associated with the function App9 is the position to which the selection button 531 associated with the function App6 is to be inserted, as a result of the user holding the enlarged selection button 531 associated with the function App6 in the insertion detection area 533 of the selection button 531 associated with the function App9. The selection button 531 associated with the function App6 is then arranged at the position where the selection button 531 associated with the function App9 has been arranged, as illustrated in a right figure of FIG. 3C. The selection buttons 531 associated with the functions App7, App8, and App9 are arranged by sequentially moving up their positions by one.

As described above, the layout change requires entry to the layout change mode from the selection mode, specifying the selection button 531 whose position is to be changed, determining the position to which the selection button 531 is to be moved, and determining whether to scroll (move) the display image 53.

In the above example, entry to the layout change mode from the selection mode and specifying the selection button 531 whose position is to be changed are performed simultaneously; however, an operation mode change button may be displayed at a predetermined position on the display screen 51. The operation mode may be changed from the selection mode to the layout change mode in response to a touch of the operation mode change button, and the selection button 531 whose position is to be changed may be specified after entry to the layout change mode. Different operation mode change buttons may be provided for entry to the layout change mode from the selection mode and for entry to the selection mode from the layout change mode, or a single operation mode change button may be used by toggling between the operation modes.

In the case of deleting the selection button 531, the user just needs to press the selection button 531 to be deleted for a predetermined period of time without dragging it. In the case of adding the selection button 531, the user just needs to add the selection button 531 to be added, at a position subsequent to the last selection button 531 and move the added selection button 531.

Now, the insertion detection area 533 will be described.

Figure 4A:
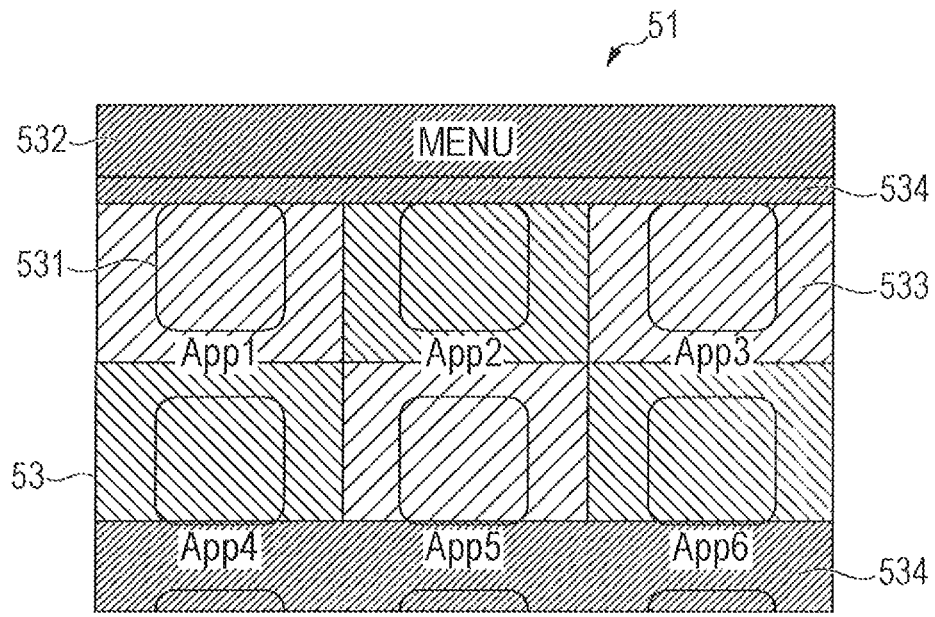
FIGS. 4A and 4B illustrate an insertion detection area in different layouts of the selection buttons, specifically.
Figure 4B:
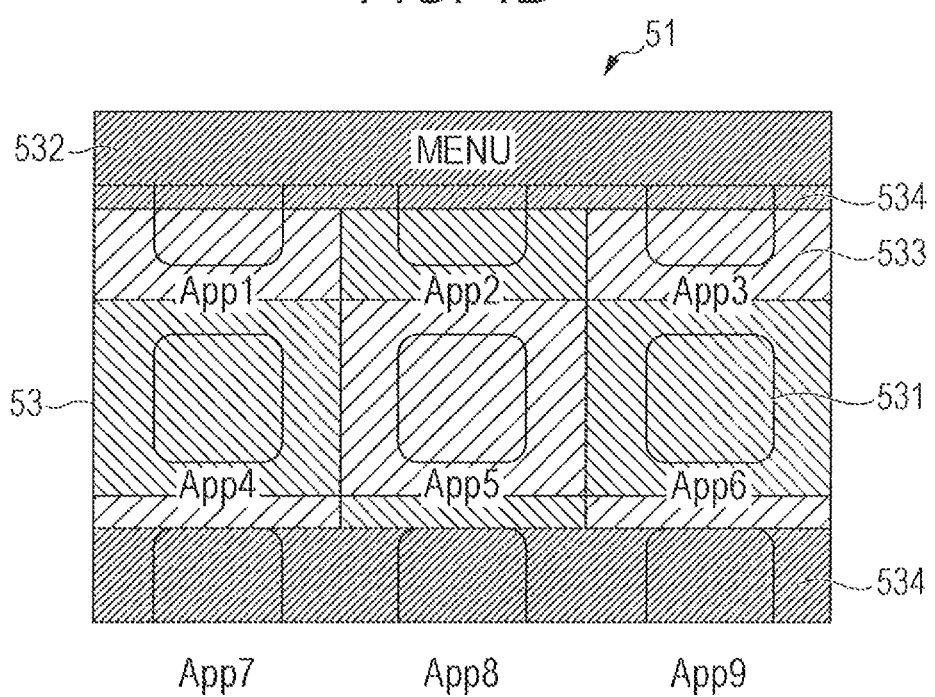

FIGS. 4A and 4B illustrate the insertion detection area 533 used to change the layout of the selection buttons 531. Specifically, FIG. 4A illustrates the case where the insertion detection area 533 is large, whereas FIG. 4B illustrates the case where the insertion detection area 533 is small.

In the display image 53, up to six selection buttons 531 are fully displayed as in FIGS. 3A to 3C.

At upper and lower portions of the display image 53, the image scrolling detection area 534 having a certain width (height) is provided.

In the case where six selection buttons 531 associated with the functions App1 to App6 are fully displayed as illustrated in FIG. 4A, the insertion detection area 533 provided over and around each of the selection buttons 531 associated with the functions App1 to App6 is large.

The upper and lower image scrolling detection areas 534 are preferentially provided in the display image 53. Thus, the insertion detection areas 533 are provided in an area other than the image scrolling detection areas 534.

If the display image 53 illustrated in FIG. 4A is scrolled up, three selection buttons 531 associated with the functions App4 to App6 are fully displayed but the selection buttons 531 associated with the functions App1 to App3 and App7 to App9 are partially displayed as illustrated in FIG. 4B.

In this case, the insertion detection areas 533 for the three selection buttons 531 associated with the functions App4 to App6 are large but the insertion detection areas 533 of the selection buttons 531 associated with the functions App1 to App3 and App7 to App8 are small.

The insertion detection areas 533 of the selection buttons 531 associated with the functions App1 to App3 are decreased because of the upper image scrolling detection area 534. Similarly, the selection buttons 531 associated with the functions App7 to App9 barely have their insertion detection areas 533 because of the lower image scrolling detection area 534.

As a result, for example, if the user attempts to move the selection button 531 associated with the function App6 to the position of one of the selection buttons 531 associated with the functions App1 to App3 and App7 to App9, the small insertion detection area 533 makes it difficult to determine the position to which the selection button 531 associated with the function App6 is to be moved.

Accordingly, in the first exemplary embodiment, a scroll adjustment (transition adjustment) is performed to make the insertion detection areas 533 larger at entry to the layout change mode.

FIGS. 5A to 5C illustrate a scroll adjustment according to the first exemplary embodiment. Specifically, FIG. 5A illustrates the case where a scroll adjustment is not needed, whereas FIGS. 5B and 5C illustrate the case where a scroll adjustment is performed.

The case of determining whether to perform a scroll adjustment by using a reference line L will be described. To simplify the description, it is assumed that up to six selection buttons 531 are fully displayed in the display image 53.

As illustrated in FIG. 5A, the reference line L is provided at the upper portion of the display screen 51 to extend in the horizontal direction. In this case, the display image 53 is scrolled up and down. Thus, the reference line L is provided to extend in the direction perpendicular to the direction of scroll.

It is determined whether to perform a scroll adjustment depending on whether the selection buttons 531 overlap the reference line L.

Referring to FIG. 5A, the selection buttons 531 do not cross the reference line L.

The user long-presses the selection button 531 associated with the function App6 and changes the operation mode to the layout change mode in order to change the position of the selection button 531 associated with the function App6 as illustrated in a central figure of FIG. 5A.

Then, the selection button 531 associated with the function App6 is displayed in an enlarged manner as illustrated in a right figure of FIG. 5A. In this way, the user is informed that the operation mode has entered the layout change mode.

The display control unit 52 detects that the reference line L and the selection buttons 531 do not overlap with each other and thus determines not to perform a scroll adjustment.

This is because six selection buttons 531 are fully displayed as illustrated in FIG. 5A and the insertion detection areas 533 of the selection buttons 531 are large as in FIG. 4A.

In contrast, referring to FIG. 5B, the reference line L and the selection buttons 531 associated with the functions App1 to App3 overlap with each other. This indicates that the insertion detection areas 533 of some of the selection buttons 531 are small as in FIG. 4B. Specifically, the insertion detection areas 533 of the selection buttons 531 associated with the functions App1 to App3 and App7 to App9 are small in FIG. 5B.

The user long-presses the selection button 531 associated with the function App6 and changes the operation mode to the layout change mode in order to change the position of the selection button 531 associated with the function App6 as illustrated in a central figure of FIG. 5B.

Then, the display control unit 52 changes the operation mode from the selection mode to the layout change mode and performs a scroll adjustment by scrolling down the display image 53 so that the selection buttons 531 associated with the functions App1 to App3 do not overlap the reference line L as illustrated in a right figure of FIG. 5B. In this way, the selection buttons 531 associated with the functions App1 to App3 are fully displayed and their insertion detection areas 533 are made large.

In the right figure of FIG. 5B, a scroll adjustment is made by scrolling down the display image 53. In contrast, a scroll adjustment may be made by scrolling up the display image 53 as illustrated in a right figure of FIG. 5C. When a scroll adjustment is performed by scrolling up the display image 53, the selection buttons 531 associated with the functions App4 to App9 are fully displayed in the display image 53 and their insertion detection areas 533 are made large.

Left and central figures of FIG. 5C are the same as the left and central figures of FIG. 5B, respectively.

The direction of scroll in the scroll adjustment may be pre-set to either up or down as illustrated in the right figure of FIG. 5B or FIG. 5C. In addition, a scroll adjustment may be performed by scrolling the display image 53 in a second direction for which a distance over which the selection button 531 is moved becomes smaller than that for a first direction. Further, the display image 53 may be scrolled in a direction based on how the selection button 531 overlaps the reference line L, that is, in a direction with a larger area by comparing an area of the selection button 531 located above the reference line L with an area of the selection button 531 located below the reference line L.

It is determined whether to perform a scroll adjustment on the selection buttons 531, for example, in accordance with the overlapping state of the reference line L and the selection buttons 531. For example, it may be determined whether to perform a scroll adjustment in accordance with the overlapping state of a point provided on the display screen 51 and the selection buttons 531. In the case of using the reference line L and of scrolling the display image 53 to the left and right, another reference line extending in the vertical direction needs to be provided on the display screen 51. In the case of using a point on the display screen 51, both the case of scrolling up and down and the case of scrolling to the left and right may be handled with a single point.

Further, it may be determined whether to perform a scroll adjustment in accordance with the overlapping state of the selection buttons 531 and either edge of the display screen 51, that is, how much area of each selection button 531 is missing.

In the above example, a scroll adjustment is performed so that the selection buttons 531 are fully displayed at the upper edge of the display screen 51. The scroll adjustment may be performed so that the selection buttons 531 are fully displayed at the lower edge of the display screen 51. In these cases, the scroll adjustment is performed in the vertical direction.

A scroll adjustment may be performed so that the selection buttons 531 are fully displayed at the left or right edge of the display screen 51 by performing the scroll adjustment sideways.

Further, in the case where the display screen 51 is rectangular, a scroll adjustment may be performed in the vertical direction and sideways with respect to adjacent two edges (two sides).

Furthermore, in the case where the title image 532 is displayed at a predetermined position of the display screen 51 in a fixed manner, a scroll adjustment may be performed at a portion of the display screen 51 other than a portion where the title image 532 is displayed.

In such cases, a scroll adjustment is performed in a direction for which the insertion detection areas 533 of the multiple selection buttons 531 displayed in the display image 53 increase as a whole. Accordingly, the position of the reference line L on the display screen 51 just needs to be set so that the insertion detection areas 533 of the multiple selection buttons 531 displayed in the display image 53 increase as a whole when the scroll adjustment is performed on the display image 53 on the basis of the reference line L.

Alternatively, an arrangement in which the insertion detection areas 533 of the multiple selection buttons 531 displayed on the display screen 51 increase as a whole may be calculated in advance, and a scroll adjustment may be performed so that the selection buttons 531 are arranged on the display screen 51 after scrolling (transition) in the arrangement calculated in advance.

Further, the selection buttons 531 may be fully displayed by reducing the size of the selection buttons 531 when the operation mode enters the layout change mode.

This configuration also increases the insertion detection areas 533 of the selection buttons 531 as a whole.

Furthermore, in the case where the title image 532 is displayed at a predetermined position of the display screen 51 all the time, a setting is made so as to increase the insertion detection areas 533 of the multiple selection buttons 531 displayed in a portion of the display screen 51 other than a portion where the title image 532 is displayed as a whole.

Second Exemplary Embodiment

In a second exemplary embodiment, it is determined whether to perform a scroll adjustment in accordance with the type of an operation (gesture) with a finger for scrolling. For example, scroll by drag and scroll by flick are distinguished from each other, and it is determined whether to perform a scroll adjustment based on the result.

As described above, "drag" is an operation in which the user moves their finger off the display screen 51 after moving the finger on the display screen 51, while keeping the finger in contact with the display screen 51. An amount of scroll is set in accordance with a distance over which the finger is moved.

"Flick" is an operation in which a user moves their finger off the display screen 51 like brushing the display screen 51 after touching the display screen 51 with their finger. An amount of scroll is set in proportion to a speed at which or a distance over which the finger is moved.

"Drag" allows the user to decide upon the position which the user wishes to display as intended. "Flick" allows the user to display the following content with a rough operation.

For example, the display control unit 52 does not perform a scroll adjustment if it detects scroll by drag. In contrast, the display control unit 52 performs a scroll adjustment if it detects scroll by flick. The configuration may be made oppositely.

A scroll adjustment just needs to be performed in the case where the insertion detection areas 533 of the selection buttons 531 displayed in the display image 53 are small as illustrated in FIGS. 5B and 5C in the first exemplary embodiment. The direction of the scroll adjustment may be a down scroll adjustment as illustrated in the right figure of FIG. 5B or an up scroll adjustment as illustrated in the right figure of FIG. 5C. Alternatively, a vertical scroll adjustment and a sideways scroll adjustment may be performed in combination as described in the first exemplary embodiment.

A request for a scroll adjustment based on an operation with the finger may differ from user to user. Whether to perform a scroll adjustment based on an operation with the finger may be set by each user.

Further, an operation with the finger performed to instruct a scroll adjustment may be an operation other than "drag" or "flick". For example, even in the case of "flick", the flick operation may be classified into three types. In the case of "flick" with a small movement distance, it is determined that the operation is equivalent to "drag", and a configuration is made not to perform a scroll adjustment. In the case of "flick" with a large movement distance, a configuration may be made to switch the display screen 51 on a page-by-page basis (on a size of the display screen 51 basis) instead of performing a scroll adjustment. In the case of "flick" with an intermediate movement distance, a configuration may be made to perform a scroll adjustment.

Third Exemplary Embodiment

In a third exemplary embodiment, it is determined whether to perform a scroll adjustment in accordance with the number of selection buttons 531 being displayed on the display screen 51.

Figure 6:
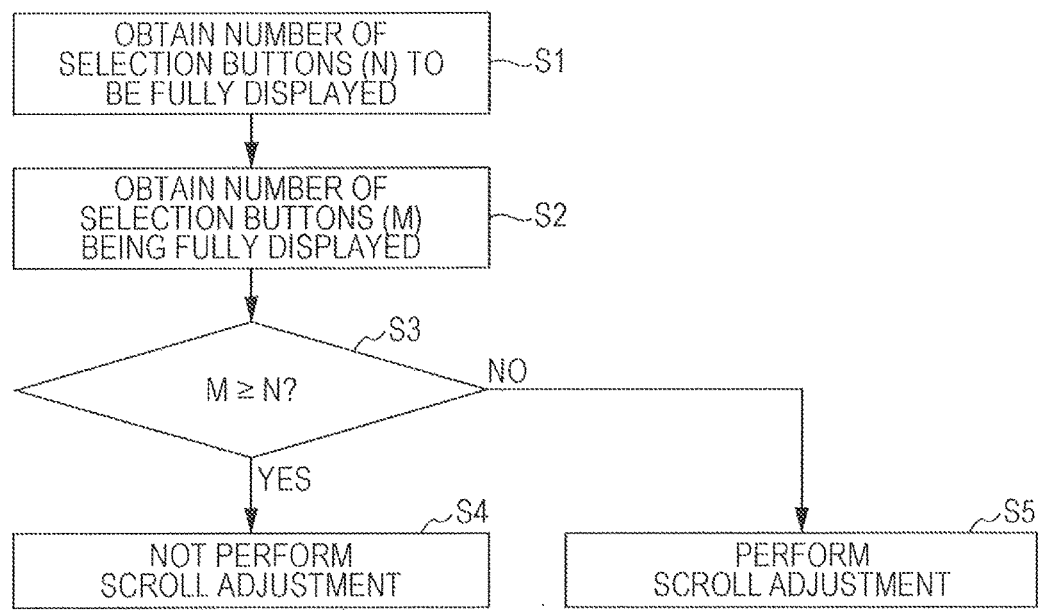
FIG. 6 is a flowchart for determining whether to perform a scroll adjustment according to a third exemplary embodiment.

FIG. 6 is a flowchart for determining whether to perform a scroll adjustment according to the third exemplary embodiment.

In the third exemplary embodiment, the number of selection buttons 531 to be fully displayed on the display screen 51, which is denoted by N, is set. If the number of selection buttons 531 being fully displayed in the display image 53, which is denoted by M, is smaller than the number of selection buttons 531 to be fully displayed (M<N), a scroll adjustment is performed.

First, the number of selection buttons 531 to be fully displayed on the display screen 51 (N) is obtained (step 1 which is denoted as S1 in FIG. 6).

Then, the number of selection buttons 531 being fully displayed in the display image 53 (M) is obtained (step 2).

Then, it is determined whether the number of selection buttons 531 being fully displayed is larger than or equal to the number of selection buttons 531 to be fully displayed (M≥N) (step 3).

In the case of YES in step 3, a scroll adjustment is not performed (step 4).

In the case of NO in step 3, a scroll adjustment is performed (step 5).

Figure 7A:
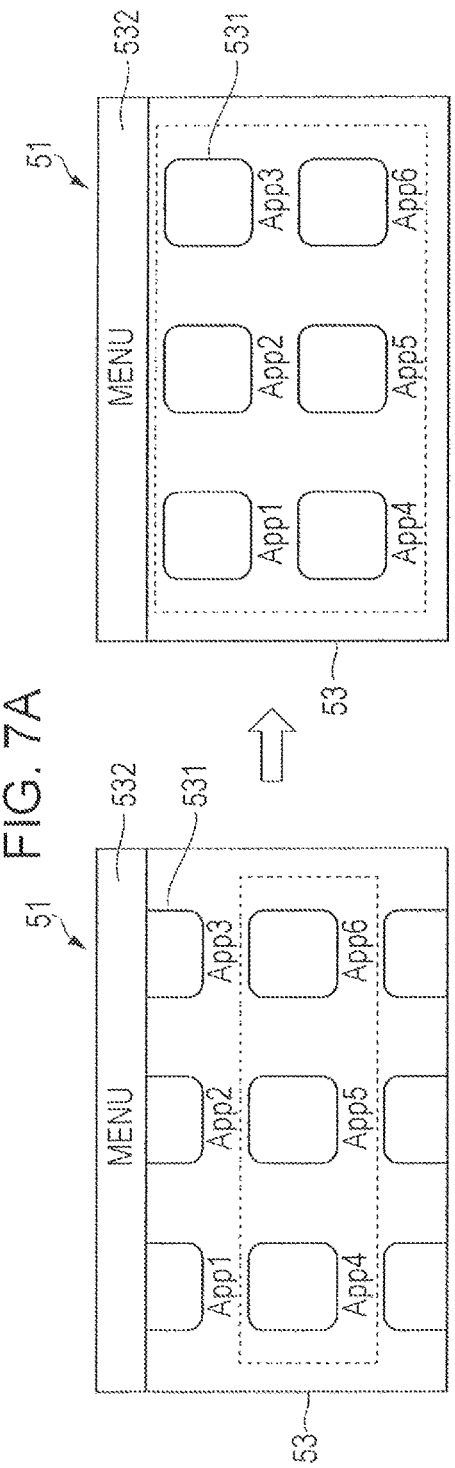
FIGS. 7A and 7B illustrate the cases of performing and not performing a scroll adjustment when the number of selection buttons to be displayed on the display screen is set to 5 (N=5), specifically.
Figure 7B:
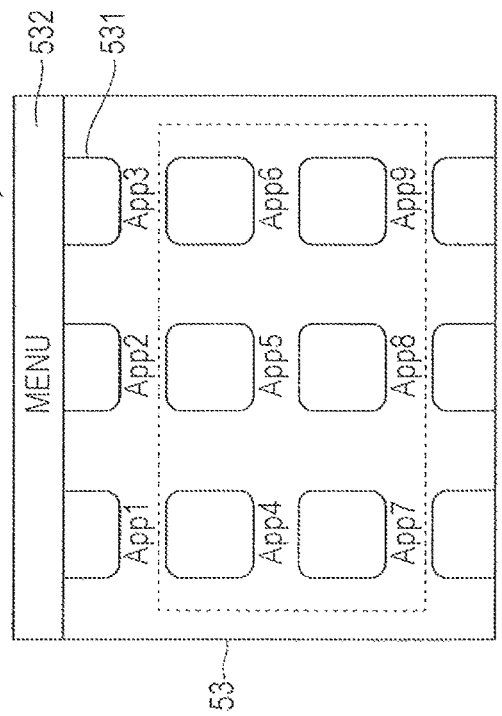

FIGS. 7A and 7B illustrate the case of performing a scroll adjustment and the case of not performing a scroll adjustment when the number of selection buttons 531 to be displayed on the display screen 51 (N) is set to 5. Specifically, FIG. 7A illustrates the case of performing a scroll adjustment, whereas FIG. 7B illustrates the case of not performing a scroll adjustment.

In the display image 53 illustrated in FIG. 7A, up to six selection buttons 531 are fully displayed. Accordingly, the number of selection buttons 531 to be displayed in the display image 53 (N) is set to 5. Then, the number of selection buttons 531 being fully displayed (M) is 3 in a left figure of FIG. 7A. That is, the number of selection buttons 531 being fully displayed (M), which is equal to 3, is smaller than the number of selection buttons 531 to be displayed (N), which is equal to 5. Accordingly, a scroll adjustment is performed as illustrated in a right figure of FIG. 7A. In the right figure of FIG. 7A, six selection buttons 531 are fully displayed.

In the display image 53 illustrated in FIG. 7B, six selection buttons 531 associated with the functions App4 to App9 are fully displayed. Accordingly, in the case where the number of selection buttons 531 to be fully displayed (N) is set to 5, a scroll adjustment is not performed.

The number of selection buttons 531 being displayed in the display image 53 is decided upon depending on the size (dimensions) of the display screen 51 and the size (dimensions) of each selection button 531. Accordingly, the method for determining whether to perform a scroll adjustment described in the third exemplary embodiment is also applicable to the case where the size of the display screen 51 or the size of each selection button 531 changes.

A predetermined value N is set for the display screen 51 having a certain size, and large selection buttons 531 are used. In such a case, a scroll adjustment may be performed if the number of selection buttons 531 being fully displayed (M) is smaller than the value N.

In the case where small selection buttons 531 are used so that the number of selection buttons 531 being displayed (M) is larger than or equal to the value N all the time, a scroll adjustment need not be performed.

Conversely, in the case where the display screen 51 is small and the number of selection buttons 531 displayed is small, a scroll adjustment may be performed. In the case where the display screen 51 is large and the number of selection buttons 531 displayed is large, no scroll adjustment may be performed. That is, it may be determined whether to perform a scroll adjustment depending on the size of the display screen 51. This configuration eliminates the necessity of changing the display control unit 52 even when display devices having display screens of different sizes are used.

The first to third exemplary embodiments described above may be used in combination.

In the first to third exemplary embodiments above, the display unit 5 of the image processing apparatus 100 has been described; however, the first to third exemplary embodiments may be applied to a display unit of other apparatuses. The first to third exemplary embodiments may be applied further to a display unit of mobile phones, smartphones, tables, or personal computers, for example. That is, the first to third exemplary embodiments are applicable to the case where multiple selection buttons are arranged in a menu screen.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
   a display that is configured to display a plurality of images; and
   at least one processor configured to implement:
      a mode changer that is configured to change an operation mode between a selection mode and a layout change mode, the layout change mode being a mode in which an order of the plurality of images is changeable;
      a scroller that is configured to scroll the displayed plurality of images on the display such that an image that is being partially displayed is fully displayed without any missing portion on the display; and
      a determiner that is configured to determine whether the scroller scrolls the displayed plurality of images in response to the operation mode being the layout change mode,
   wherein the scroller is configured to scroll the displayed plurality of images in accordance with a result of a determination by the determiner, and
   wherein the scroller is configured to, in response to an area for detecting insertion of another image when the image is fully displayed without any missing portion being larger than an area for detecting insertion of another image when the image is partially displayed, scroll the displayed plurality of images such that the image that is being partially displayed is fully displayed without any missing portion.

2. The display device according to claim 1, wherein the scroller is configured to reduce a size of the plurality of displayed images in response to the display device entering the layout change mode.

3. A display device comprising:
   a display that is configured to display a plurality of images; and
   at least one processor configured to implement:
      a mode changer that is configured to change an operation mode between a selection mode and a layout change mode, the layout change mode being a mode in which an order of the plurality of images is changeable;
      a scroller that is configured to scroll the displayed plurality of images on the display such that an image that is being partially displayed is fully displayed without any missing portion on the display; and
      a switcher that is configured to switch between a case in which the image that is being partially displayed is scrolled by the scroller and a case in which the image that is being partially displayed remains partially displayed on the display, wherein the partially displayed image is displayed on the display in response to the operation mode being the layout change mode, in accordance with an operation for changing a display image with a finger,
   wherein the switcher is configured to switch to the case in which the image that is being partially displayed is scrolled by the scroller such that the scroller scrolls the displayed plurality of images, in response to the partially displayed image overlapping a virtual reference line that is virtually extended on the display.

4. An image processing apparatus comprising:
   a display device including:
      a display that is configured to display a plurality of images; and
      at least one processor configured to implement:
         a mode changer that is configured to change an operation mode between a selection mode and a layout change mode, the layout change mode being a mode in which an order of the plurality of images is changeable;

a scroller that is configured to scroll the displayed plurality of images on the display such that an image that is being partially displayed is fully displayed without any missing portion on the display;

a determiner that is configured to determine whether the scroller scrolls the displayed plurality of images in response to the operation mode being the layout change mode;

wherein the scroller is configured to scroll the displayed plurality of images in accordance with a result of a determination by the determiner, and wherein the determiner is configured to determine that the scroller scrolls the displayed plurality of images in response to the partially displayed image overlapping a virtual reference line that is virtually extended on the display.

5. The image processing apparatus according to claim 4, wherein a scrolling direction is determined by how the partially displayed image overlaps the virtual reference line.

6. A non-transitory computer readable medium storing a program causing a computer to execute a process for display control, the process comprising:

displaying a plurality of images on a display;

changing an operation mode between a selection mode and a layout change mode, the layout change mode being a mode in which an order of the plurality of images is changeable; and scrolling the displayed plurality of images on the display such that an image that is being partially displayed is fully displayed without any missing portion on the display, wherein a determination is made regarding whether to scroll the displayed plurality of images in response to the operation mode being the layout change mode, wherein the scrolling the displayed plurality of images is performed in accordance with a result of the determination, and wherein in response to a result of the determination that the partially displayed image overlapping a virtual reference line that is virtually extended on the display, the scrolling of the displayed plurality of images is performed.

7. A display control method comprising:

displaying a plurality of images on a display;

changing an operation mode between a selection mode and a layout change mode, the layout change mode being a mode in which an order of the plurality of images is changeable; and scrolling the displayed plurality of images on the display such that an image that is being partially displayed is fully displayed without any missing portion on the display, wherein a determination is made regarding whether to scroll the displayed plurality of images in response to the operation mode being the layout change mode, wherein the scrolling the displayed plurality of images is performed in accordance with a result of the determination, and wherein in response to a result of the determination that the partially displayed image overlapping a virtual reference line that is virtually extended on the display, the scrolling of the displayed plurality of images is performed.

* * * * *